(12) United States Patent
Eichholz et al.

(10) Patent No.: US 10,691,521 B2
(45) Date of Patent: Jun. 23, 2020

(54) USING TELEMETRY TO DRIVE HIGH IMPACT ACCESSIBILITY ISSUES

(71) Applicant: Microsoft Technology Licensing, LLC, Redmond, WA (US)

(72) Inventors: Heather Marie Eichholz, Redmond, WA (US); Somya Sharma, Bellevue, WA (US); Kent Spencer Barker, Woodinville, WA (US); Anguel Spassov Dimitrov, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 170 days.

(21) Appl. No.: 15/897,839

(22) Filed: Feb. 15, 2018

(65) Prior Publication Data

US 2019/0250977 A1    Aug. 15, 2019

(51) Int. Cl.
*G06F 11/00*    (2006.01)
*G06F 11/07*    (2006.01)

(52) U.S. Cl.
CPC ...... *G06F 11/0769* (2013.01); *G06F 11/0706* (2013.01); *G06F 11/0751* (2013.01); *G06F 11/0781* (2013.01)

(58) Field of Classification Search
CPC ............ G06F 11/0718; G06F 11/0778; G06F 11/0781; G06F 11/0784; G06F 11/36; G06F 11/324; G06F 11/3409; G06F 11/3438
See application file for complete search history.

(56) References Cited

U.S. PATENT DOCUMENTS

| | | | |
|---|---|---|---|
| 6,889,255 B1 | 5/2005 | DeLuca | |
| 8,001,527 B1 | 8/2011 | Qureshi et al. | |
| 9,590,880 B2 | 3/2017 | Ashby et al. | |
| 9,639,412 B1 | 5/2017 | Levy et al. | |
| 10,140,102 B2 * | 11/2018 | Cragun | G06F 8/38 |

(Continued)

FOREIGN PATENT DOCUMENTS

EP    1868099 A1    12/2007

OTHER PUBLICATIONS

"BMC TrueSight App Visibility Manager", Retrieved from: <<https://web.archive.org/web/20150405060237/http:/documents.bmc.com/products/documents/16/91/461691/461691.pdf>>, Apr. 5, 2015, 2 Pages.

(Continued)

*Primary Examiner* — Christopher S McCarthy
(74) *Attorney, Agent, or Firm* — Ray Quinney & Nebeker; Tiffany Healy

(57) ABSTRACT

Methods and devices for identifying accessibility issues for assistive technology operating on a computer device. The methods and devices may include automatically detecting at least one accessibility error for the assistive technology operating on the computer device. The methods and devices may include identifying application information for one or more applications associated with the at least one accessibility error and identifying element information where the at least one accessibility error occurred. The methods and devices may include generating error data for the at least one accessibility error with the application information and the element information. The methods and devices may include transmitting the error data.

20 Claims, 6 Drawing Sheets

(56) References Cited

U.S. PATENT DOCUMENTS

| | | | |
|---|---|---|---|
| 10,169,188 B2* | 1/2019 | Belekar | G06F 3/0484 |
| 10,423,709 B1* | 9/2019 | Bradley | G06F 16/986 |
| 2007/0074167 A1* | 3/2007 | Cohrs | G06F 11/3672 |
| | | | 717/124 |
| 2008/0072155 A1* | 3/2008 | Detweiler | G06F 3/0489 |
| | | | 715/729 |
| 2014/0115506 A1 | 4/2014 | George et al. | |
| 2014/0351796 A1* | 11/2014 | Gur-esh | G06F 11/3604 |
| | | | 717/126 |
| 2015/0121219 A1* | 4/2015 | Baklanovs | G06F 16/22 |
| | | | 715/712 |
| 2015/0220417 A1* | 8/2015 | Diment | G06F 11/3438 |
| | | | 709/224 |
| 2016/0204992 A1 | 7/2016 | Wu et al. | |
| 2018/0004547 A1* | 1/2018 | Hayes | G06F 9/453 |

OTHER PUBLICATIONS

"Android doesn't update accessibility focus rect when an object moves", Retrieved from: <<https://bugs.chromium.org/p/chromium/issues/detail?id=407871>>, Aug. 26, 2014, 4 Pages.

"BMC TrueSight Operations Management", Retrieved from: <<https://web.archive.org/web/20161221231818/http:/documents.bmc.com/products/documents/73/90/477390/477390.pdf>>, Dec. 21, 2016, 2 Pages.

Hopkins, et al., "Accessibility testing", Retrieved from: <<https://docs.microsoft.com/en-us/windows/uwp/design/accessibility/accessibility-testing>>, Feb. 8, 2017, 10 Pages.

"Getting started with IBM Monitoring and Analytics", Retrieved from: <<https://console.bluemix.net/docs/services/monana/index.html>>, Retrieved on: Dec. 28, 2017, 5 Pages.

* cited by examiner

USING TELEMETRY TO DRIVE HIGH IMPACT ACCESSIBILITY ISSUES

BACKGROUND

The present disclosure relates to identifying accessibility issues for users of computer devices.

Today all electronics and information technology must be accessible to individuals with disabilities. As such, individuals with disabilities may use assistive technologies, such as screen readers, magnifiers, and/or speech recognition to use applications and/or user interfaces operating on computer devices. However, accessibility errors may occur when a user access an application and/or user interface that may prevent assistive technologies from working effectively.

Thus, there is a need in the art for improvements in identifying errors and/or accessibility issues with applications and/or user interfaces.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory configured to store data and instructions, at least one processor configured to communicate with the memory, an operating system configured to communicate with the memory and the processor. The operating system may be operable to automatically detect at least one accessibility error for assistive technology operating on the computer device; identify application information for one or more applications associated with the at least one accessibility error; identify element information where the at least one accessibility error occurred; generate error data for the at least one accessibility error with the application information and the element information; and transmit the error data.

Another example implementation relates to a method for identifying accessibility issues for assistive technology operating on a computer device. The method may include automatically detecting, at an operating system executing on the computer device, at least one accessibility error for the assistive technology operating on the computer device. The method may include identifying application information for one or more applications associated with the at least one accessibility error. The method may include identifying element information where the at least one accessibility error occurred. The method may include generating error data for the at least one accessibility error with the application information and the element information. The method may include transmitting the error data.

Another example implementation relates to computer-readable medium storing instructions executable by a computer device. The computer-readable medium may include at least one instruction for causing the computer device to automatically detect at least one accessibility error for assistive technology operating on the computer device. The computer-readable medium may include at least one instruction for causing the computer device to identify application information for one or more applications associated with the at least one accessibility error. The computer-readable medium may include at least one instruction for causing the computer device to identify element information where the at least one accessibility error occurred. The computer-readable medium may include at least one instruction for causing the computer device to generate error data for the at least one accessibility error with the application information and the element information. The computer-readable medium may include at least one instruction for causing the computer device to transmit the error data.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
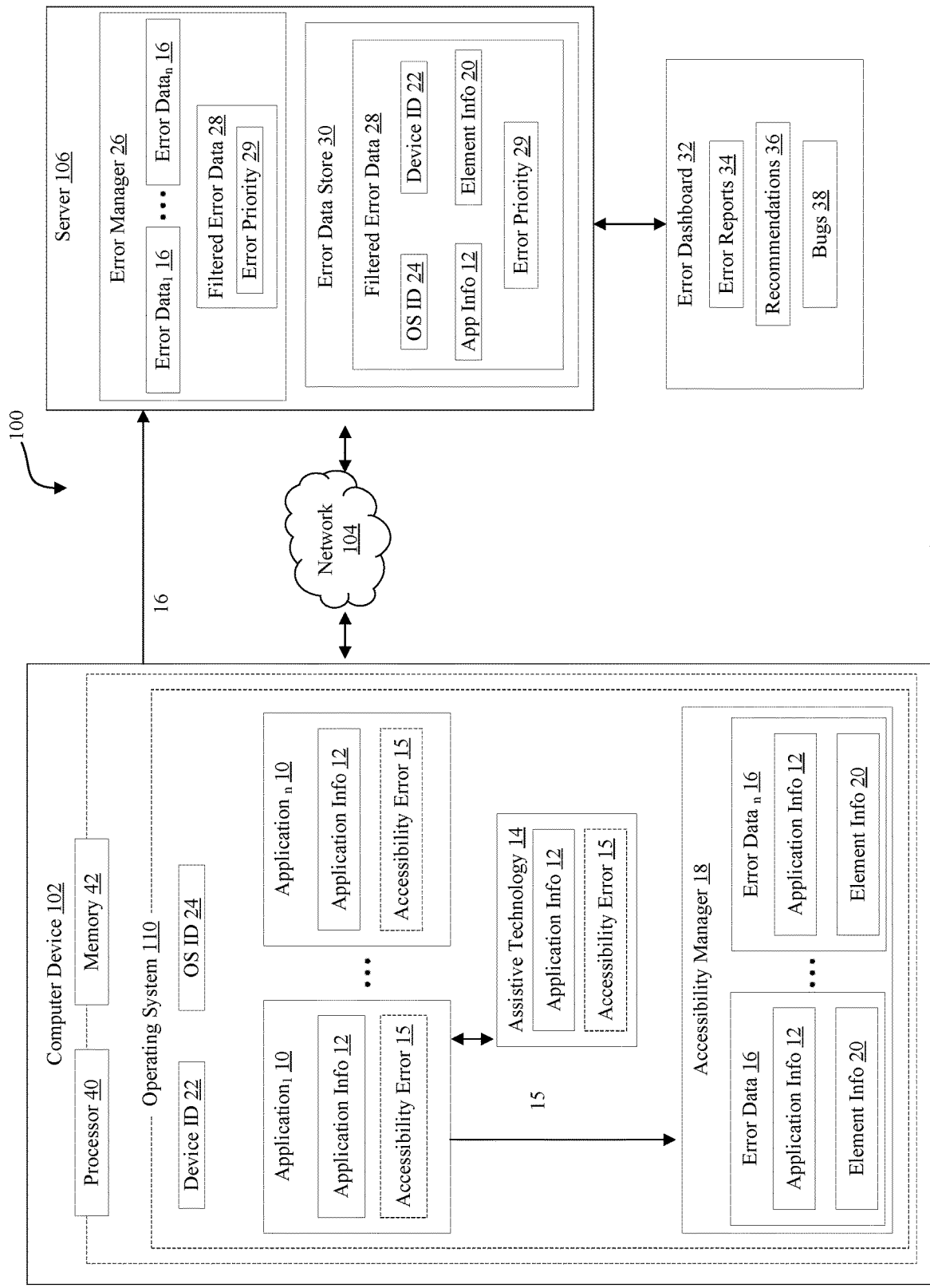
FIG. 1 is a schematic block diagram of an example computer device and server in accordance with an implementation of the present disclosure.

This disclosure relates to devices and methods for identifying accessibility issues for assistive technology operating on a computer device. Assistive technology may be used by users of computer devices that may have a disability and/or differing needs that requires assistance when using a computer device. Assistive technology may identify one or more properties of applications executing on the computer device and communicate the properties of the applications to the user so that the user may use the computer devices. Examples of assistive technology may include, but are not limited to, screen readers, magnifiers, speech recognition software, and/or narrator programs. For example, a visually impaired individual may use a screen reader when using a computer device to read the content of the computer screen.

The devices and methods may have an accessibility manager executing on a computer device that identifies one or more accessibility errors that may prevent the assistive technology from operating effectively. Accessibility errors may include one or more controls and/or elements in an application's user interface (UI) missing accessibility properties and/or patterns that may allow assistive technology to operate effectively, such as but not limited to, missing a name property, missing a definition, missing state information, and/or missing coordinate information. Accessibility errors may also include improper names of controls and/or elements within an application so that the names may not be informative and/or may not provide sufficient context to a user to understand the properties of the application. Accessibility errors may also include undefined bounding rectangles of each control in an application, null bounding rectangles, bounding rectangles that may be lacking definiteness, bounding rectangles that may be an improper size, and/or bounding rectangles that may be inconsistent with the visual representation of the application on a display so that the assistive technology may be unable to locate the application on a display and/or controls within the application. Accessibility errors may also include inconsistent relationships within controls of the application and/or duplicative attribute values between controls of the application.

The accessibility manager may scan application information associated with the applications executing on computer device and determine whether any accessibility errors may exist for a respective application. When an accessibility error is identified for an application, the accessibility manager may generate error data for the accessibility error. The error data may identify the accessibility error (e.g., missing a name property and/or undefined boundary coordinates) and the application where the error occurred. In addition, the error data may include the control that has the error and properties of the control's parent and application window.

The accessibility manager may operate silently in the background of the computer device without any user input and/or knowledge. The accessibility manager may collect data on the accessibility experience without relying on the user using the assistive technology. As such, the accessibility manager may capture the error data without user invocation and/or knowledge. In addition, the accessibility manager may operate on application developers computer devices so that accessibility errors may be identified during the application development process and addressed prior to the release of the application.

The accessibility manager may transmit the received error data to a server, such as a cloud server. The accessibility manager may cache the received error data on the computer device and may only send unique errors to the server. The server may have an error manager that may receive the error data from one or more computer devices and may identify an error priority for the received error data. In addition, the error manager may remove duplicative data to generate filtered error data. The server may store the filtered error data, for example, in an error data store that aggregates the received filtered error data from a plurality of computer devices in communication with the server. The filtered error data on the server may be accessed by any service and/or website to use in any way needed, for example, to generate reports and/or identify accessibility issues.

The server may also communicate with an error dashboard that may be accessed to allow investigation, prioritization, and/or reporting of accessibility issues. The error dashboard may be used by application developers and/or owners of the operating system to drive accessibility compliance with government regulations and/or identify any bugs in the software.

As such, the devices and methods may be used to automatically capture accessibility error data without accessibility expertise, manual testing, and/or assistive technology for collecting the accessibility error data. Moreover, the devices and methods may use the captured error data to drive accessibility compliance and/or prioritize accessibility issues based on usage trends.

Referring now to FIG. 1, illustrated is an example system 100 for use with identifying one or more accessibility issues for assistive technology 14 operating on a computer device 102. System 100 may include one or more computer devices 102 in communication with at least one server 106 via a network, such as a wireless and/or wired network.

Computer device 102 may have one or more assistive technology 14 operating on computer device 102. Examples of assistive technology 14 may include, but are not limited to, screen readers, magnifiers, special keyboards, speech recognition software, and/or narrator programs. For example, a visually impaired individual may use a magnifier when using a computer device to read the content of the computer screen. The assistive technology 14 may be used to access one or more (up to n, where n is an integer) applications 10 executed by processor 40 and/or system memory 42 of computer device 102.

The assistive technology 14 may identify application information 12, such as but, not limited to, an application name, an application definition, state information of the application, a process name, coordinate information for the application, and/or application version. The application information 12 may be used by the assistive technology 14 to provide a user of computer device 102 a description of application 10. For example, a screen reader may identify an "okay button" icon displayed on a webpage. In addition, the screen reader may provide the user with the properties associated with the "okay button" by for example describing the name of the icon, e.g., "okay button," and notifying the user whether the button is selected.

One or more accessibility errors 15 may occur when the assistive technology 14 accesses application 10 that prevents the assistive technology 14 from operating effectively. Accessibility errors 15 may include one or more controls and/or elements in an application's 10 user interface missing accessibility properties and/or patterns that may allow the assistive technology 14 to operate effectively. Examples of missing properties and/or patterns may include, but are not limited to, missing a name property, missing a focus property (e.g., a keyboard focus property), missing a definition, missing state information, missing a selection pattern, missing a grid pattern, missing a table pattern, missing a toggle pattern, missing an expand and/or collapse pattern, missing a text pattern, and/or missing coordinate information.

Accessibility errors 15 may also include improper names of controls and/or controls within application 10 so that the names may not be informative and/or may not provide sufficient context to a user to understand the properties of application 10. Improper names may include, but are not limited to, names that exceed a length requirement (e.g., greater than 512 characters), names that include a control type, names that include a control role (e.g., localized control types), names that include operating system specific naming conventions, and/or names that are a combination of unreadable dot characters).

Accessibility errors 15 may also include undefined bounding rectangles of each control in an application 10, null bounding rectangles, bounding rectangles that may be lacking definiteness, bounding rectangles that may be an improper size and/or bounding rectangles that may be inconsistent with the visual representation of application 10 on a display so that the assistive technology 14 may be unable to locate application 10 on a display and/or controls within application 10. An example of a bounding rectangle that may be lacking definiteness includes a bounding rectangle with coordinates of {0,0,0,0} for the location of the bounding rectangle on the display. An example of a bounding rectangle that may be an improper size is a bounding rectangle that is less than a minimum size set for the bounding rectangle (e.g., less than 5×5). Examples of bounding rectangles that may be inconsistent with the visual representation of the application on a display may include a bounding rectangle of a control intersecting with a parent and/or a bounding rectangle of the parent control contained within a child control.

Accessibility errors 15 may also include inconsistent relationships within controls of application 10 and/or duplicative attribute values between controls of application 10. For example, inconsistent relationships within controls of the application may include a control's parent has the control as one of its children and/or a control's next sibling has the control as its previous sibling. Examples of duplicative attribute values between controls may include controls having the same name as its parent and/or controls having the same name as its sibling of the same control type.

For example, if a control in application 10 is missing name information, the assistive technology 14 may not be able to describe the control to the user. Another example, may include when a control in application 10 is missing coordinate information that identifies a location on the screen for the control, a keyboard that a user is using may not be able to focus properly on the control and may accidently interact with a different application and/or control than indented by the user. Yet another example may include a hyperlink missing a definition so that the assistive technology 14 is unable to describe the hyperlink to a user. Another example may include an okay button missing status information so the assistive technology 14 is unable to communicate to a user whether the okay button is selected.

Computer device 102 may include an operating system 110 executed by processor 40 and/or system memory 42 of computer device 102. System memory 42 may be configured for storing data and/or computer-executable instructions defining and/or associated with operating system 110, and processor 40 may execute operating system 110. An example of system memory 42 can include, but is not limited to, a type of memory usable by a computer, such as random access memory (RAM), read only memory (ROM), tapes, magnetic discs, optical discs, volatile memory, non-volatile memory, and any combination thereof. An example of processor 40 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include an accessibility manager 18 that may scan applications 10 for possible accessibility errors 15. For example, accessibility manager 18 may scan the application information 12 associated with one or more applications 10 to identify whether any application information 12 may be missing from applications 10. When application information 12 is missing from one or more applications 10, accessibility manager 18 may identify the missing application information 12 as an accessibility error 15. For example, if application 10 is missing coordinate information, accessibility manager 18 may identify an accessibility error 15 of missing coordinate information for application 10.

Accessibility manager 18 may operate silently in the background of computer device 102 without any user input and/or knowledge. Accessibility manager 18 may collect data on the accessibility experience of a user without relying on the user using the assistive technology 14. As such, the accessibility manager 18 may identify accessibility errors 15 without user invocation and/or knowledge. In an implementation, accessibility manager 18 may operate on computer devices 102 of application developers to identify accessibility errors 15 during the development of applications 10 so that accessibility issues may be addressed earlier during the development of applications 10.

When at least one accessibility error 15 is identified and/or received by accessibility manager 18, accessibility manager 18 may create error data 16 (up to m, where m is an integer) for the one or more accessibility errors 15 identified. Error data 16 may include any identified application information 12 and/or element information 20 collected where the error occurred in application 10. Element information 20 may include, but is not limited to, control properties (e.g., control type, localized control type, automation ID, name hash, class name, framework ID, localized class name, runtime ID, and/or bounding rectangle). Error data 16 may include, for example, an operating system ID 24, a user ID of a user account on computer device 102, a device ID 22, application information 12 (e.g., a process name, application name, application version, package name, and/or package version), an application window runtime ID, a scan ID, error details (e.g., test performed, error found), control properties (e.g., control type, localized control type, automation ID, name hash, class name, framework ID, localized class name, runtime ID, and/or bounding rectangle), and/or parent properties (e.g., control type, localized control type, automation ID, name hash, class name, framework ID, localized class name, runtime ID, and/or bounding rectangle). Error data 16 may also include usage information, such as, but not limited to, a start and stop time of accessibility manager 18, a last error code identified by accessibility manager 18, a scan start and stop time of application 10, a number of controls scanned in application 10, a size of the data error cache of accessibility manager 18, and a time when the data error cache is cleared.

In an implementation, accessibility manager 18 may need to infer which control in application 10 may have an accessibility error 15. For example, accessibility manager 18 may identify the control by control and/or parent bounding rectangles received with the error data 16. For example, accessibility manager 18 may send control and/or parent bounding rectangles with the error data 16. If an control does not have a valid bounding rectangle, accessibility manager 18 may move up the data structure tree to identify the first ancestor with a valid bounding rectangle and send the bounding rectangles, along with the bounding level with the error data 16 to identify how far accessibility manager 18 had to traverse up the data structure tree. While aggregating the error data 16, accessibility manager 18 may keep the details from the biggest application window reported.

Accessibility manager 18 may store the error data 16 until transmission to server 106 and may periodically transmit the error data 16 to server 106. In an implementation, accessibility manager 18 may reduce the volume of error data 16 transmitted to server 106 by only transmitting error data 16 for an accessibility error 15 for a respective application 10 once. As such, duplicative error data 16 for the same accessibility error 15 may not be transmitted to server 106.

Server 106 may include an error manager 26 that may receive the error data 16 from one or more computer devices 102 in communication with server 106 and may identify an error priority 29 for the received error data 16. The error priority 29 may be based upon the type of accessibility error 15 identified and/or a number of users that identified the accessibility error 15. For example, error manager 26 may identify error data 16 as a high priority when the error data 16 is received from a large number of users. Another example may include error manager 26 identifying error data 16 as a low priority when received from a limited number of users. Error manager 26 may also identify the error data as a high priority when interactive controls (e.g., a button, edit box, slider, check box, radio button, hyperlinks) are missing accessible names.

In an implementation, the error data 16 may be unable to identify a specific control in application 10 that may have the accessibility error 15 because the control may be missing automation IDs and/or names. Moreover, identifying a specific control may be difficult based on, for example, personally identifiable information concerns. For example, accessibility manager 18 may not be able to capture a screenshot when an error occurs due to personally identifiable information concerns. As such, error manager 26 may need to infer which control in application 10 may have an accessibility error 15.

For example, error manager 26 may use a runtime ID of the control to infer which control in application 10 may have an accessibility error 15. A control's runtime ID is unique for as long as an application is running. As such, error manager 26 may use runtime IDs to uniquely identify controls under the same application window runtime ID. When aggregating the error data 16 captured by accessibility manager 18, error manager 26 may aggregate unique runtime ids to get control runtimes, parent runtimes and window runtimes. Information regarding the number and type of controls having errors under a parent and the number and type of parent controls in a window may be helpful in identifying the controls in application 10 that may have an accessibility error 15.

For example, if the same error for the same control type is received multiple times in a browser application and the control runtime count ranges from 5 to 50 over different users but they all have the same parent. Now, let's say the bounding rectangles indicate that the controls are to the right of the screen, error manager 26 may infer that the errors may be in the items under history, downloads or favorites. Based on the control type, error manager 26 may be able to identify the controls.

In addition, error manager 26 may generate filtered error data 28. For example, error manager 26 may remove duplicative error data 16 received from computer devices 102 for the same accessibility error 15. In addition, error manager 26 may remove error data 16 for specific applications. For example, if error data is received for a third party competitor application, error manager 26 may remove the error data 16 for the third part competitor application from the filtered error data 28.

Server 106 may have an error data store 30 that may store the aggregated filtered error data 28 from computer devices 102 in communication with server 106. The filtered error data 28 may include, but is not limited to, the operating system ID 24, device ID 22, application information 12, element information 20, and/or the error priority 29. The filtered error data 28 may be accessed by any service and/or website to use in any way needed, for example, to generate reports and/or identify accessibility issues.

Server 106 may also communicate with an error dashboard 32. Error dashboard 32 may access the filtered error data 28 on server 106 and may generate one or more error reports 34 based on the filtered error data 28 to identify one or more accessibility errors 15 associated with applications 10. Error dashboard 32 may be hosted on a different server than server 106. Users of system 100 may access error dashboard 32, for example, through a website using a user account to view the one or more error reports 34. In addition, the one or more error reports 34 may be sent to applications owners and/or developers to drive accessibility compliance of applications 10.

Error dashboard 32 may also provide one or more recommendations 36 to application owners and/or developers for which accessibility errors 15 to fix first. In addition, error dashboard 32 may identify one or more bugs 38 and associate the identified bugs 38 to the filtered error data 28. As such, error dashboard 32 may be used by users of system 100 to investigate accessibility issues, drive accessibility compliance, and/or prioritize accessibility issues based on usage trends.

Figure 2:
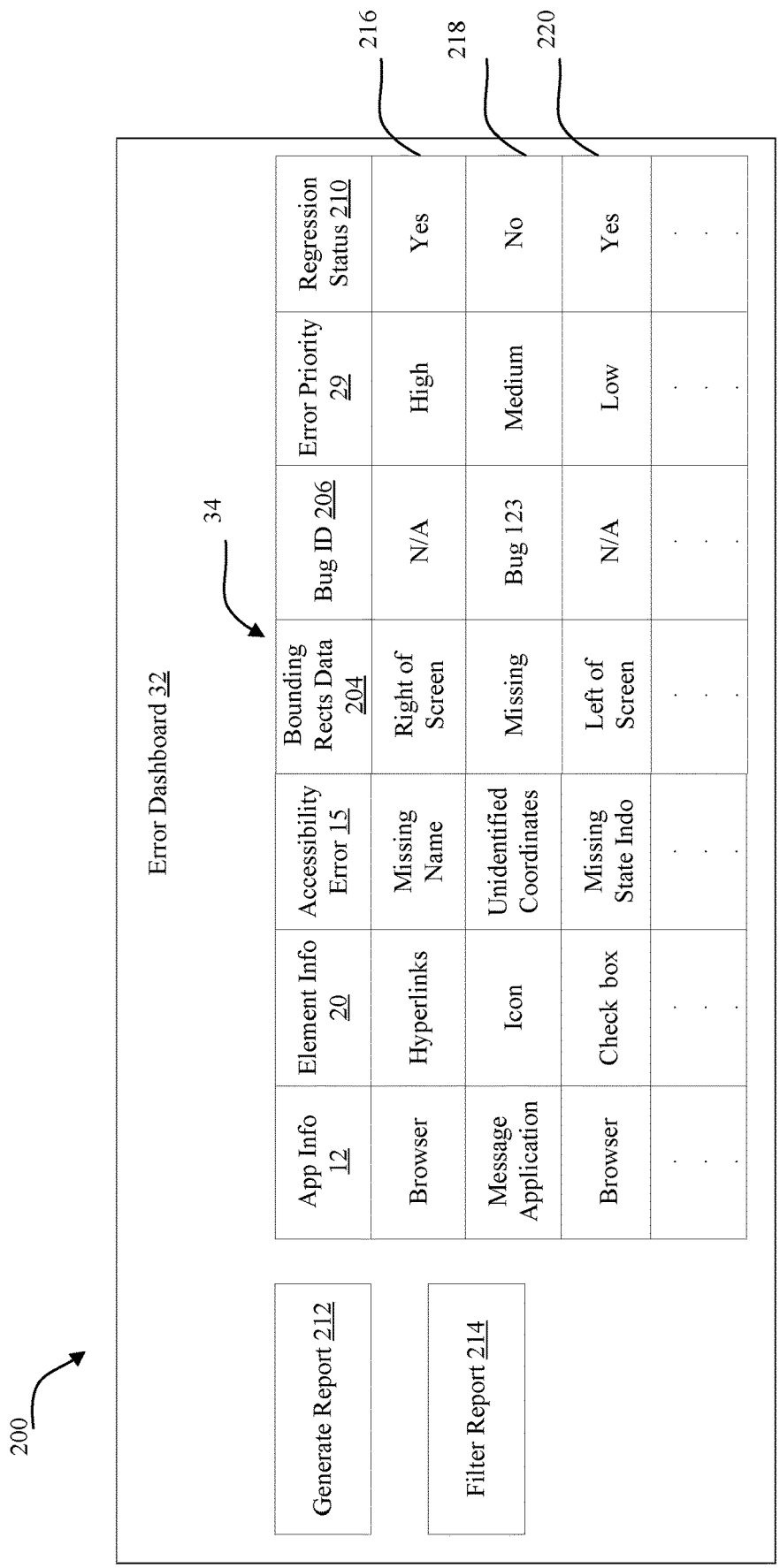
FIG. 2 is an example user interface screen of an error dashboard in accordance with an implementation of the present disclosure.

Referring now to FIG. 2, an example user interface screen 200 of an error dashboard 32 may include an error report 34. Error reports 34 may be automatically generated by error dashboard 32 based on the stored filtered error data 28. In addition, a user of error dashboard 32 may provide one or more criteria for the error report 34 and my select a generate report icon 212 to generate the error report 34.

Error report 34 may include, for example, application information 12, element information 20, bounding rectangles data 204, bug IDs 206, error priority 29, and a regression status 210 for one or more accessibility errors 15 identified. The regression status 210 may be based upon the filtered error data 28 (FIG. 1) received for a previous version of an application 10 (FIG. 1) and/or operating system 110 (FIG. 1). For example, error dashboard 32 may create a snap shot of the error data 16 at the end of a release of a previous version of the application 10 and/or operating system 110 to create a baseline to compare the filtered error data 28 received for a new version of the application 10 and/or operating system 110. The comparison with the baseline data may be used to flag or otherwise identify new errors. When new errors are identified for the application 10 and/or operating system 110 that were not previously identified, the new errors may be flagged as regressions.

The bounding rectangles data 204 may be used to get a better understanding of the position of the control with the accessibility error 15 on the display. In addition, when a bug is filed, for example, by an expert and/or application owner through the error dashboard 32, the filtered error data 28 may be compared with the bug information and error data 16 may be tagged with a bug ID 206 if a match occurs. The bug ID 206 may be used for filtering new versus know accessibility issues.

The example error report 34 may include in row 216 "browser" as the application information 12 and "hyperlinks" as the element information 20 that has been identified has having an accessibility error 15 of "missing a name." In addition, row 216 may have "right of screen" as the bounding rectangles data 204 where the hyperlink is located on the display. Row 216 may identify the error priority 29 as "high" and the regression status 210 may be identified as "yes" (e.g., this is a new error from a previous version of the browser). Row 216 may also indicate that there is no bug ID 206 associated with this accessibility error 15.

Error report 34 may also include row 218 that has "message application" as the application information 12 and "icon" as the element information 20. Row 218 may indicate that the accessibility error 15 includes "undefined coordinates" for the icon and the bounding rectangles data 204 may be missing. Row 218 may also identify the error priority 29 as "medium." In addition, row 218 may also indicate that the regression status 210 is "no" and that the associated bug ID 206 is "BUG 123."

Error report 34 may also include row 220 that indicates "browser" as the application information 12 and "check box" as the element information 20 that has the accessibility error 15 of "missing state information" so that the user is unable to understand whether the check box is selected. The bounding rectangles data 204 may indicate that the check box is on the left of the display. Row 220 may also indicate that the error priority 29 is low and that the regression status 210 is "yes." In addition, row 220 may indicate that there is no bug ID 206 associated with this accessibility error 15.

Error report 34 may aggregate the filtered error data 28 received over a period of time (e.g., a month) and may illustrate the errors per application 10. A user of error dashboard 32, such as an application owner and/or application developer, may select a filter report icon 214 to filter error report 34 by a variety of factors. For example, a user may select to filter error report 34 by error priority 29, regression status 210, and bug ID 206.

Moreover, error report 34 may be used to track a compliance status of applications 10 with government regulations and/or flag regressions that may have occurred between versions of software.

In addition, error report 34 may be used to drive release quality measures. For example, when the error reports 34 indicate that the accessibility error 15 has a high error priority 29 and/or has a regression status 210 of "yes," the application 10 and/or operating system 110 may be prevented from being released until the accessibility error 15 is fixed.

As such, error dashboard 32 may be used to investigate accessibility issues, drive accessibility compliance, and/or prioritize accessibility issues based on usage trends.

Figure 3:
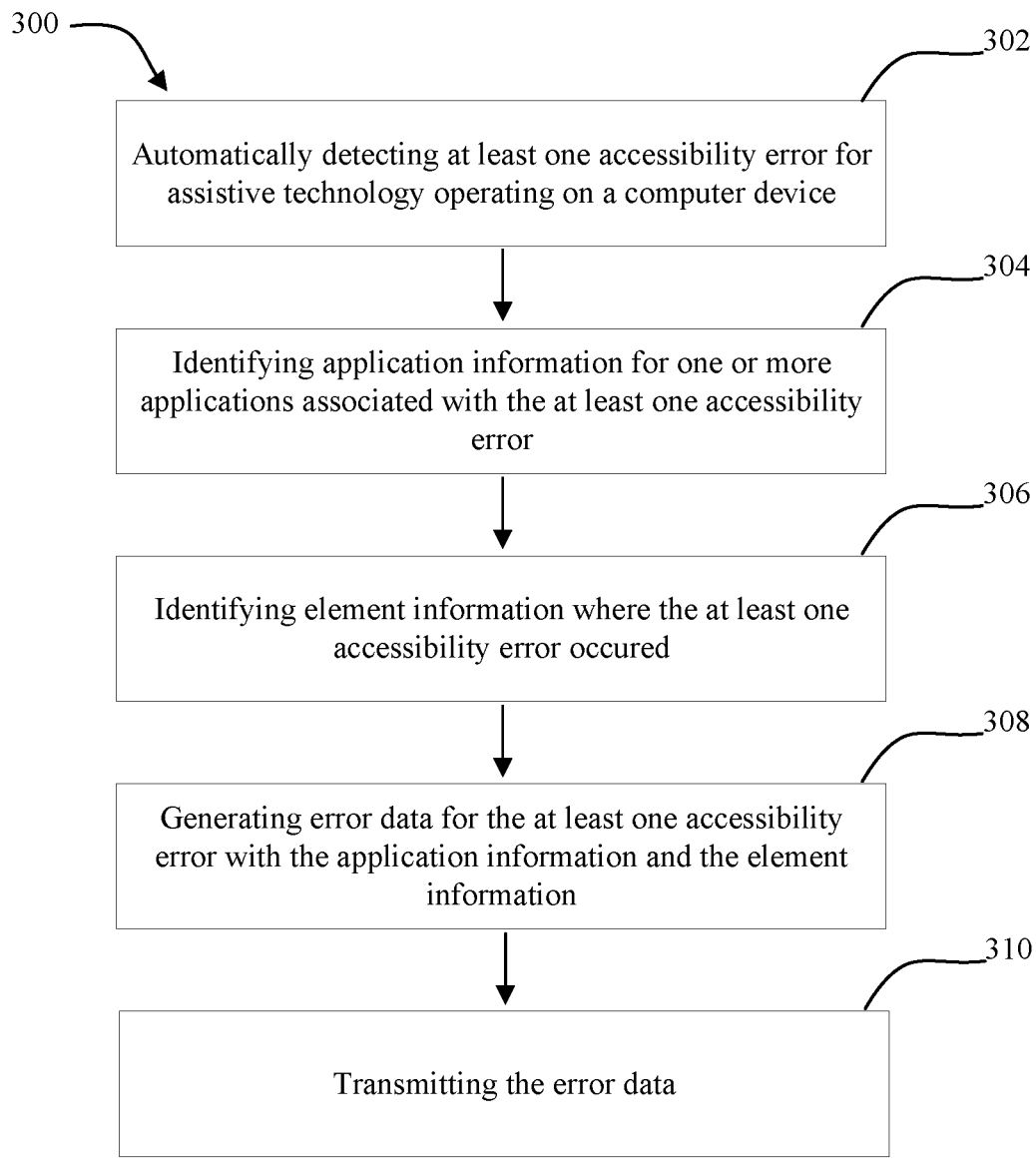
FIG. 3 is a flow chart of an example method for identifying accessibility issues for assistive technology operating on a computer device in accordance with an implementation of the present disclosure.

Referring now to FIG. 3, an example method 300 may be used by computer device 102 (FIG. 1) for identifying accessibility issues for assistive technology 14 operating on computer device 102. The actions of method 300 may be discussed below with reference to the architecture of FIG. 1.

At 302, method 300 may include automatically detecting at least one accessibility error for assistive technology operating on a computer device. Assistive technology may be used by users of computer devices that may have a disability and/or differing needs that requires assistance when using a computer device. Assistive technology may identify one or more properties of applications executing on the computer device and communicate the properties of the applications to the user so that the user may use the computer devices. Examples of assistive technology 14 may include, but are not limited to, screen readers, magnifiers, special keyboards, speech recognition software, and/or narrator programs. For example, a visually impaired individual may use a magnifier when using a computer device to read the content of the computer screen. The assistive technology 14 may be used to access one or more applications 10 executing on computer device 102.

One or more accessibility errors 15 may occur when the assistive technology 14 accesses application 10 that prevents the assistive technology 14 from operating effectively. Example accessibility errors 15 may include, but are not limited to, one or more controls and/or elements in an application's user interface missing a name property, missing a definition, missing state information, and/or missing coordinate information. For example, if a control in application 10 is missing name information, the assistive technology 14 may not be able to describe the control to the user. Another example, may include when a control in application 10 is missing coordinate information that identifies a location on the screen for the control, a keyboard that a user is using may not be able to focus properly on the control and may accidently interact with a different application and/or control than indented by the user. Yet another example may include a hyperlink missing a definition so that the assistive technology 14 is unable to describe the hyperlink to a user. Another example may include an okay button missing status information so the assistive technology 14 is unable to communicate to a user whether the okay button is selected.

An accessibility manager 18 may scan applications 10 for possible accessibility errors 15. For example, accessibility manager 18 may scan the application information 12 associated with one or more applications 10 to identify whether any application information 12 may be missing from applications 10. When application information 12 is missing from one or more applications 10, accessibility manager 18 may identify the missing application information 12 as an accessibility error 15. For example, if application 10 is missing coordinate information, accessibility manager 18 may identify an accessibility error 15 of missing coordinate information for application 10.

Accessibility manager 18 may operate silently in the background of computer device 102 without any user input and/or knowledge. Accessibility manager 18 may collect data on the accessibility experience of a user without relying on the user using the assistive technology 14. As such, the accessibility manager 18 may identify accessibility errors 15 without user invocation and/or knowledge. In an implementation, accessibility manager 18 may operate on computer devices 102 of application developers to identify accessibility errors 15 during the development of applications 10 so that accessibility issues may be addressed earlier during the development of applications 10.

At 304, method 300 may include identifying application information for one or more applications associated with the at least one accessibility error. Application information may include, but is not limited to, an application name, an application definition, state information of the application, a process name, coordinate information for the application, and/or application version. For example, accessibility manager 18 may identify the application information 12 associated with the applications 10 where the accessibility errors 15 occurred.

At 306, method 300 may include identifying element information where the at least one accessibility error occurred. Element information 20 may include, but is not limited to, control properties (e.g., automation ID, name hash, class name, framework ID, localized class name, runtime ID). For example, accessibility manager 18 may identify the element information 20 where the accessibility error 15 occurred.

In an implementation, accessibility manager 18 may need to infer which control in application 10 may have an accessibility error 15. For example, accessibility manager 18 may identify the control by control and/or parent bounding rectangles received with the error data 16. For example, accessibility manager 18 may send control and/or parent bounding rectangles with the error data 16. If an control does not have a valid bounding rectangle, accessibility manager 18 may move up the data structure tree to identify the first ancestor with a valid bounding rectangle and send the bounding rectangles, along with the bounding level with the error data 16 to identify how far accessibility manager 18 had to traverse up the data structure tree. While aggregating the error data 16, accessibility manager 18 may keep the details from the biggest application window reported.

At 308, method 300 may include generating error data for the at least one accessibility error with the application information and the element information. When at least one accessibility error 15 is identified and/or received by accessibility manager 18, accessibility manager 18 may create error data 16 (up to m, where m is an integer) for the one or more accessibility errors 15 identified. Error data 16 may include any identified application information 12 and/or element information 20 where the error occurred in application 10. Error data 16 may include, but is not limited to, an operating system ID 24, a user ID of a user account on computer device 102, a device ID 22, application information 12 (e.g., a process name, application name, application version), an application window runtime ID, a scan ID, error details (e.g., test performed, error found), control properties (e.g., control type, localized control type, automation ID, name hash, class name, framework ID, localized class name, runtime ID, and/or bounding rectangle), and/or parent properties (e.g., control type, localized control type, automation ID, name hash, class name, framework ID, localized class name, runtime ID, and/or bounding rectangle). Error data 16 may also include usage information, such as, but not limited to, a start and stop time of accessibility manager 18, a last error code identified by accessibility manager 18, a scan start and stop time of application 10, a number of controls scanned in application 10, a size of the data error cache of accessibility manager 18, and a time when the data error cache is cleared.

At 310, method 300 may include transmitting the error data. For example accessibility manager 18 may transmit the error data 16 to server 106 for further processing. For example, server 106 may receive the error data 16 and may generate filtered error data 28. Server 106 may communicate with an error dashboard 32 that may access the filtered error data 28 and generate one or more error reports 34 based on the filtered error data 28 to identify one or more accessibility errors 15 associated with applications 10. Users of system 100 may access error dashboard 32 to view the one or more error reports 34. In addition, the one or more error reports 34 may be sent to applications owners and/or developers to drive accessibility compliance of applications 10.

Error dashboard 32 may also provide one or more recommendations 36 to application owners and/or developers for which accessibility errors 15 to fix first. In addition, error dashboard 32 may identify one or more bugs 38 and associate the identified bugs 38 to the filtered error data 28. As such, error dashboard 32 may be used by users of system 100 to investigate accessibility issues, drive accessibility compliance, and/or prioritize accessibility issues based on usage trends. Additional processing performed by server 106 is discussed below in FIG. 4.

Accessibility manager 18 may store the error data 16 until transmission to server 106 and may periodically transmit the error data 16 to server 106. In an implementation, accessibility manager 18 may reduce the volume of error data 16 transmitted to server 106 by only transmitting error data 16 for an accessibility error 15 for a respective application 10 once. As such, duplicative error data 16 for the same accessibility error 15 may not be transmitted to server 106.

Figure 4:
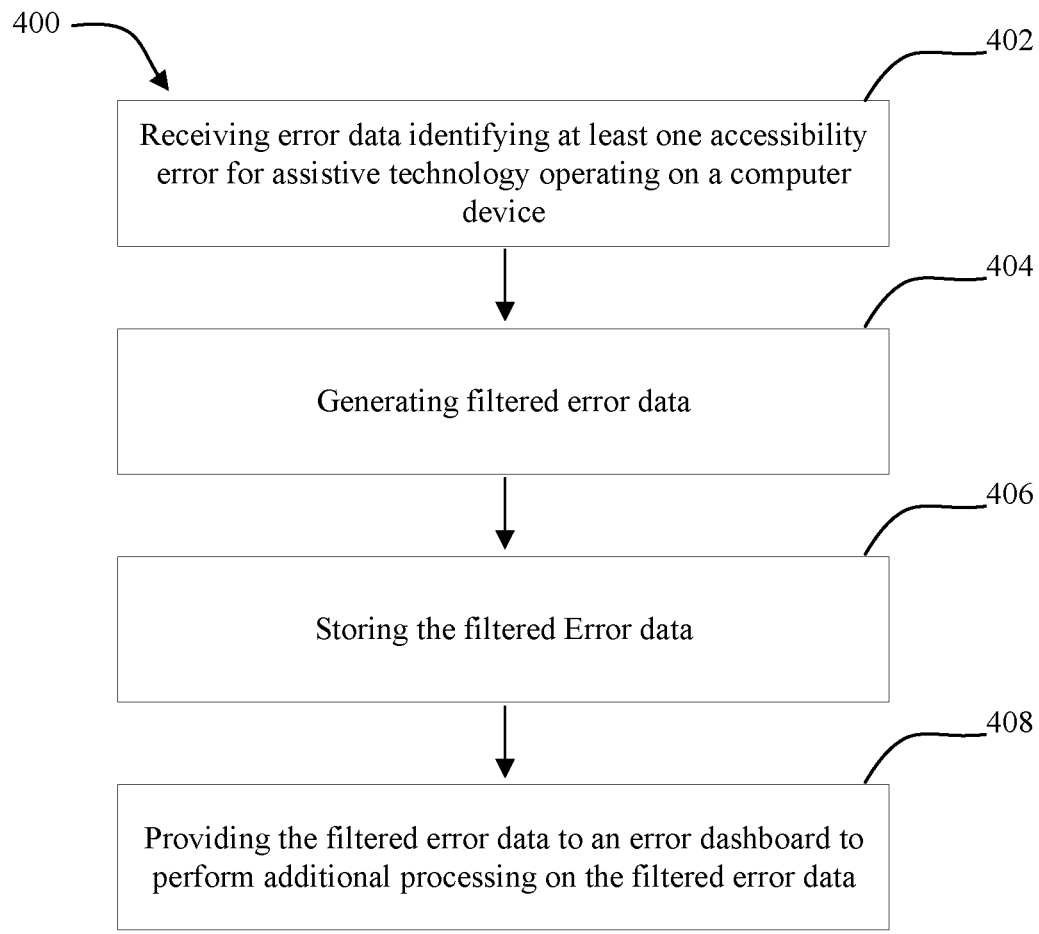
FIG. 4 is a flow chart of an example method for processing error data identifying accessibility errors in accordance with an implementation of the present disclosure.

Referring now to FIG. 4, an example method 400 may be used by server 106 (FIG. 1) for processing error data 16 identifying accessibility errors received from one or more computer devices 102 (FIG. 1). The actions of method 400 may be discussed below with reference to the architecture of FIG. 1.

At 402, method 400 may include receiving error data identifying at least one accessibility error for assistive technology operating on a computer device. Server 106 may include an error manager 26 that may receive the error data 16 from one or more computer devices 102 in communication with server 106 and may identify an error priority 29 for the received error data 16. The error priority 29 may be based upon the type of accessibility error 15 identified and/or a number of users that identified the accessibility error 15. For example, error manager 26 may identify error data 16 as a high priority when the error data 16 is received from a large number of users. Another example may include error manager 26 identifying error data 16 as a low priority when received from a limited number of users. Error manager 26 may also identify the error data as a high priority when interactive controls (e.g., a button, edit box, slider, check box, radio button, hyperlinks) are missing accessible names.

At 404, method 400 may include generating filtered error data. Error manager 26 may generate filtered error data 28. For example, error manager 26 may remove duplicative error data 16 received from computer devices 102 for the same accessibility error 15. In addition, error manager 26 may remove error data 16 for specific applications. For example, if error data is received for a third party competitor application, error manager 26 may remove the error data 16 for the third part competitor application from the filtered error data 28.

At 406, method 400 may include storing the filtered error data 406. Server 106 may have an error data store 30 that may store the aggregated filtered error data 28 from computer devices 102 in communication with server 106. The filtered error data 28 may include, but is not limited to, the operating system ID 24, device ID 22, application information 12, element information 20, and/or the error priority 29.

At 408, method 400 may include providing the filtered error data to an error dashboard to perform additional processing on the filtered error data. For example, server 106 may also communicate with an error dashboard 32 that access the filtered error data 28 and may generate one or more error reports 34 based on the filtered error data 28 to identify one or more accessibility errors 15 associated with applications 10. Users of system 100 may access error dashboard 32 to view the one or more error reports 34. In addition, the one or more error reports 34 may be sent to applications owners and/or developers to drive accessibility compliance of applications 10.

Error report 34 may aggregate the filtered error data 28 received over a period of time (e.g., a month) and may illustrate the errors per application 10. Moreover, error report 34 may be used to track a compliance status of applications 10 with government regulations and/or flag regressions that may have occurred between versions of software. Error report 34 may also be used to drive release quality measures. For example, when the error reports 34 indicate that the accessibility error 15 has a high error priority 29 and/or has a regression status 210 of "yes," the application 10 and/or operating system 110 may be prevented from being released until the accessibility error 15 is fixed.

Error dashboard 32 may also provide one or more recommendations 36 to application owners and/or developers for which accessibility errors 15 to fix first. In addition, error dashboard 32 may identify one or more bugs 38 and associate the identified bugs 38 to the filtered error data 28.

As such, error dashboard 32 may be used to investigate accessibility issues, drive accessibility compliance, and/or prioritize accessibility issues based on usage trends.

Figure 5:
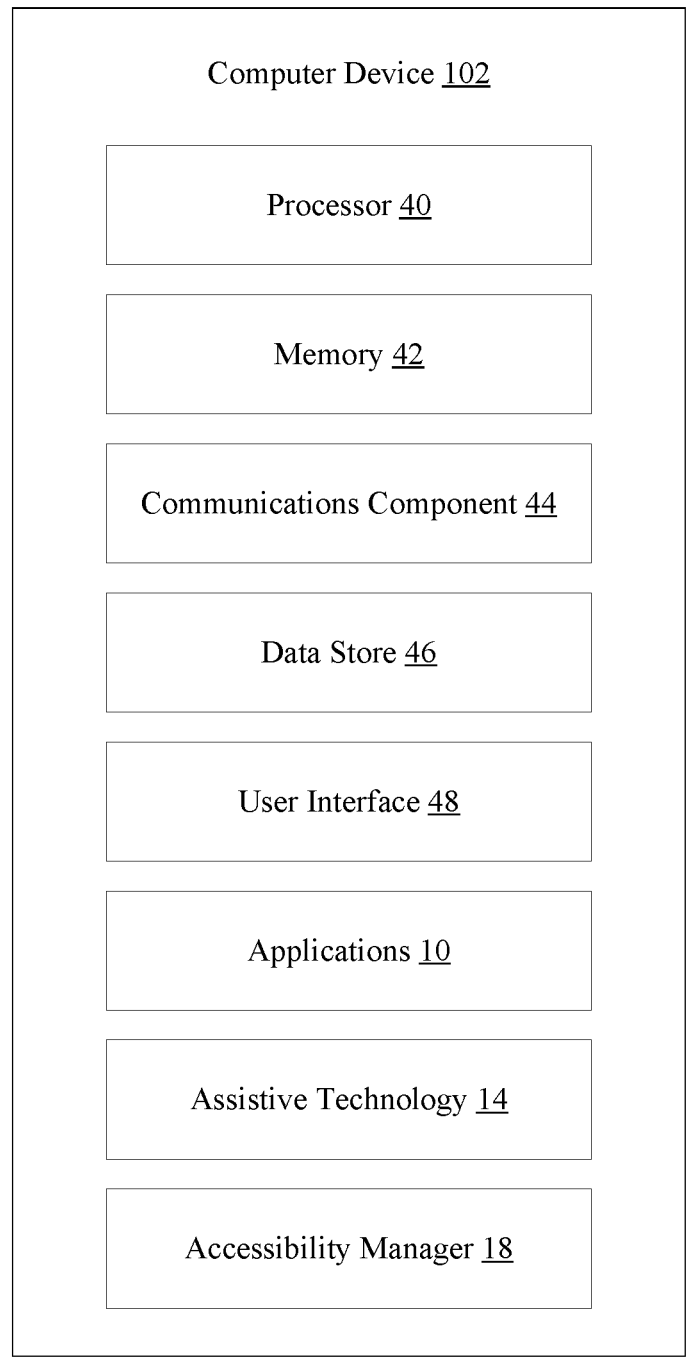
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 40 for carrying out processing functions associated with one or more of components and functions described herein. Processor 40 can include a single or multiple set of processors or multi-core processors. Moreover, processor 40 can be implemented as an integrated processing system and/or a distributed processing system.

Computer device 102 may further include memory 42, such as for storing local versions of applications being executed by processor 40. Memory 42 can include a type of memory usable by a computer, such as random access memory (RAM), read only memory (ROM), tapes, magnetic discs, optical discs, volatile memory, non-volatile memory, and any combination thereof. Additionally, processor 40 and memory 42 may include and execute operating system 110 (FIG. 1).

Further, computer device 102 may include a communications component 44 that provides for establishing and maintaining communications with one or more parties utilizing hardware, software, and services as described herein. Communications component 44 may carry communications between components on computer device 102, as well as between computer device 102 and external devices, such as devices located across a communications network and/or devices serially or locally connected to computer device 102. For example, communications component 44 may include one or more buses, and may further include transmit chain components and receive chain components associated with a transmitter and receiver, respectively, operable for interfacing with external devices.

Additionally, computer device 102 may include a data store 46, which can be any suitable combination of hardware and/or software, that provides for mass storage of information, databases, and programs employed in connection with implementations described herein. For example, data store 46 may be a data repository for applications 10 (FIG. 1), assistive technology 14 (FIG. 1), and/or accessibility manager 18 (FIG. 1).

Computer device 102 may also include a user interface component 48 operable to receive inputs from a user of computer device 102 and further operable to generate outputs for presentation to the user. User interface component 48 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 48 may include one or more output devices, including but not limited to a display, a speaker, a haptic feedback mechanism, a printer, any other mechanism capable of presenting an output to a user, or any combination thereof.

In an implementation, user interface component 48 may transmit and/or receive messages corresponding to the operation of applications 10, assistive technology 14, and/or accessibility manager 18. In addition, processor 40 executes applications 10, assistive technology 14, and/or accessibility manager 18, and memory 42 or data store 46 may store them.

Figure 6:
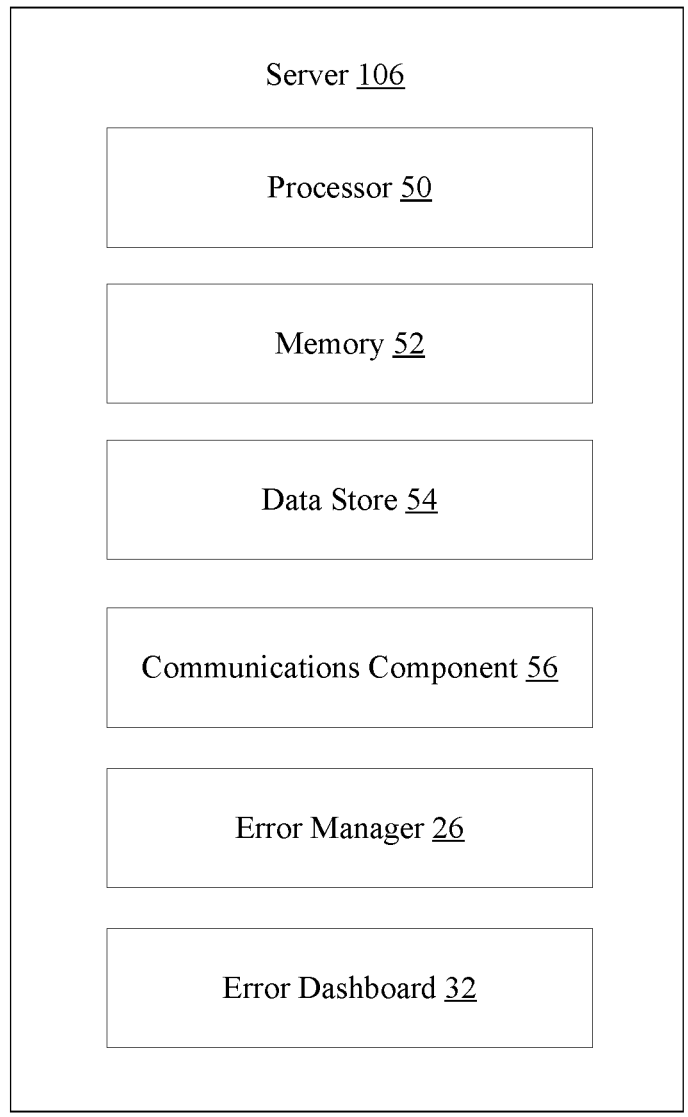
FIG. 6 is a schematic block diagram of an example server in accordance with an implementation of the present disclosure.

Referring now to FIG. 6, illustrated is an example server 106 in accordance with an implementation, including additional component details as compared to FIG. 1. In one example, server 106 may include processor 50 for carrying out processing functions associated with one or more of components and functions described herein. Processor 50 can include a single or multiple set of processors or multi-core processors. Moreover, processor 50 can be implemented as an integrated processing system and/or a distributed processing system.

Server 106 may further include memory 52, such as for storing local versions of applications being executed by processor 50. Memory 52 can include a type of memory usable by a computer, such as random access memory (RAM), read only memory (ROM), tapes, magnetic discs, optical discs, volatile memory, non-volatile memory, and any combination thereof.

Further, server 106 may include a communications component 56 that provides for establishing and maintaining communications with one or more parties utilizing hardware, software, and services as described herein. Communications component 56 may carry communications between components on server 106, as well as between server 106 and computer device 102 (FIG. 1) and/or server 106 and external devices, such as devices located across a communications network and/or devices serially or locally connected to server 106. For example, communications component 56 may include one or more buses, and may further include transmit chain components and receive chain components associated with a transmitter and receiver, respectively, operable for interfacing with external devices.

Additionally, server 106 may include a data store 54, which can be any suitable combination of hardware and/or software, that provides for mass storage of information, databases, and programs employed in connection with implementations described herein. For example, data store 54 may be a data repository for error manager 26 (FIG. 1), error data store 30 (FIG. 1) and/or error dashboard 32 (FIG. 1). In addition, processor 50 executes error manager 26, error data store 30 and/or error dashboard 32, and memory 52 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   memory configured to store data and instructions;
   at least one processor configured to communicate with the memory;
   an operating system configured to communicate with the memory and the processor, wherein the operating system is operable to:
   automatically detect at least one accessibility error for assistive technology operating on the computer device by scanning application information associated with one or more applications executing on the computer device and identifying missing application information for the one or more applications;
   identify element information where the at least one accessibility error occurred;
   generate error data for the at least one accessibility error with the application information and the element information; and
   transmit the error data.

2. The computer device of claim 1, wherein the application information includes one or more of an application name, an application definition, status information, coordinate information, a process name, and an application version.

3. The computer device of claim 1, wherein the operating system is further operable to automatically detect the at least one accessibility error by receiving the at least one accessibility error without use of the assistive technology.

4. The computer device of claim 1, wherein the at least one accessibility error includes one or more of a missing name property, a missing definition, missing state information, and missing coordinate information.

5. The computer device of claim 1, wherein the element information includes one or more of an automation identification, a name hash, a class name, a framework identification, a localized class name, and a runtime identification.

6. The computer device of claim 1, wherein the operating system is further operable to transmit the error data to a server remote from the computer device for additional processing.

7. The computer device of claim 6, wherein the additional processing includes generating an error report with an error priority for the at least one accessibility error.

8. The computer device of claim 6, wherein the additional processing includes one or more of identifying bugs in the one or more applications and providing recommendations for fixing the one or more applications.

9. A method for identifying accessibility issues for assistive technology operating on a computer device, comprising:
automatically detecting, at an operating system executing on the computer device, at least one accessibility error for the assistive technology operating on the computer device by scanning application information associated with one or more applications executing on the computer device and identifying missing application information for the one or more applications;
identifying element information where the at least one accessibility error occurred;
generating error data for the at least one accessibility error with the application information and the element information; and
transmitting the error data.

10. The method of claim 9, wherein the application information includes one or more of an application name, an application definition, status information, coordinate information, a process name, and an application version.

11. The method of claim 9, wherein automatically detecting the at least one accessibility error further includes:
receiving the at least one accessibility error without use of the assistive technology.

12. The method of claim 9, wherein the at least one accessibility error includes one or more of a missing name property, a missing definition, missing state information, and missing coordinate information.

13. The method of claim 9, wherein the element information includes one or more of an automation identification, a name hash, a class name, a framework identification, a localized class name, and a runtime identification.

14. The method of claim 9, wherein the transmitting the error data further includes:
transmitting the error data to a server remote from the computer device for additional processing.

15. The method of claim 14, wherein the additional processing includes generating an error report with an error priority for the at least one accessibility error.

16. The method of claim 14, wherein the additional processing includes one or more of identifying bugs in the one or more applications and providing recommendations for fixing the one or more applications.

17. A non-transitory computer-readable medium storing instructions executable by a computer device, comprising:
at least one instruction for causing the computer device to automatically detect at least one accessibility error for assistive technology operating on the computer device by scanning application information associated with one or more applications executing on the computer device and identifying missing application information for the one or more applications;
at least one instruction for causing the computer device to identify element information where the at least one accessibility error occurred;
at least one instruction for causing the computer device to generate error data for the at least one accessibility error with the application information and the element information; and
at least one instruction for causing the computer device to transmit the error data.

18. A computer device, comprising:
memory configured to store data and instructions;
at least one processor configured to communicate with the memory;
an operating system configured to communicate with the memory and the processor, wherein the operating system is operable to:
automatically detect at least one accessibility error for assistive technology operating on the computer device, wherein the at least one accessibility error includes one or more of a missing name property, a missing definition, missing state information, and missing coordinate information;
identify application information for one or more applications associated with the at least one accessibility error;
identify element information where the at least one accessibility error occurred;
generate error data for the at least one accessibility error with the application information and the element information; and
transmit the error data.

19. A method for identifying accessibility issues for assistive technology operating on a computer device, comprising:
automatically detecting, at an operating system executing on the computer device, at least one accessibility error for the assistive technology operating on the computer device, wherein the at least one accessibility error includes one or more of a missing name property, a missing definition, missing state information, and missing coordinate information;
identifying application information for one or more applications associated with the at least one accessibility error;
identifying element information where the at least one accessibility error occurred;
generating error data for the at least one accessibility error with the application information and the element information; and
transmitting the error data.

20. A non-transitory computer-readable medium storing instructions executable by a computer device, comprising:
at least one instruction for causing the computer device to automatically detect at least one accessibility error for assistive technology operating on the computer device, wherein the at least one accessibility error includes one or more of a missing name property, a missing definition, missing state information, and missing coordinate information;
at least one instruction for causing the computer device to identify application information for one or more applications associated with the at least one accessibility error;
at least one instruction for causing the computer device to identify element information where the at least one accessibility error occurred;
at least one instruction for causing the computer device to generate error data for the at least one accessibility error with the application information and the element information; and
at least one instruction for causing the computer device to transmit the error data.

* * * * *